United States Patent [19]

Conrad et al.

[11] Patent Number: 5,465,115
[45] Date of Patent: Nov. 7, 1995

[54] VIDEO TRAFFIC MONITOR FOR RETAIL ESTABLISHMENTS AND THE LIKE

[75] Inventors: Gary L. Conrad, Elgin; Byron A. Denenberg, Northfield; George L. Kramerich, Chicago, all of Ill.

[73] Assignee: RCT Systems, Inc., Wheeling, Ill.

[21] Appl. No.: 370,825

[22] Filed: Jan. 10, 1995

Related U.S. Application Data

[63] Continuation of Ser. No. 62,306, May 14, 1993, abandoned.
[51] Int. Cl.[6] ............................................. H04N 7/18
[52] U.S. Cl. .............................. 348/155; 348/170
[58] Field of Search ........................ 348/150, 155, 348/169, 170, 218; H04N 7/18

[56] References Cited

U.S. PATENT DOCUMENTS

| | | | |
|---|---|---|---|
| 3,736,376 | 5/1973 | Kato, Jr. ................................ | 178/6.8 |
| 4,688,090 | 8/1987 | Veitch . | |
| 4,908,704 | 3/1990 | Fujioka et al. . | |
| 5,097,328 | 3/1992 | Boyette ................................ | 358/108 |
| 5,134,472 | 7/1992 | Abe ...................................... | 348/155 |
| 5,136,383 | 8/1992 | Shepard et al. . | |
| 5,196,929 | 3/1993 | Miyasaka . | |
| 5,243,418 | 9/1993 | Kuno et al. .......................... | 358/108 |

*Primary Examiner*—Howard W. Britton
*Assistant Examiner*—Richard Lee
*Attorney, Agent, or Firm*—Arnold, White & Durkee

[57] ABSTRACT

A video traffic monitor and method for counting people using video imaging provides an inexpensive hardware implementation for analyzing real-time video where the operational environment presents a reasonably restricted traffic flow, such as in the entryway of a building. The video traffic monitor utilizes a windowed subsample of an image frame, and the image frame is further subdivided into gates. The video traffic monitor processes this windowed area to highlight the objects moving through the gates. The gates are then analyzed to determine a direction of movement for the people and support the logic for noise elimination and object discrimination. The video traffic monitor counts the detected people and records the count according to the direction of movement of the people.

36 Claims, 14 Drawing Sheets

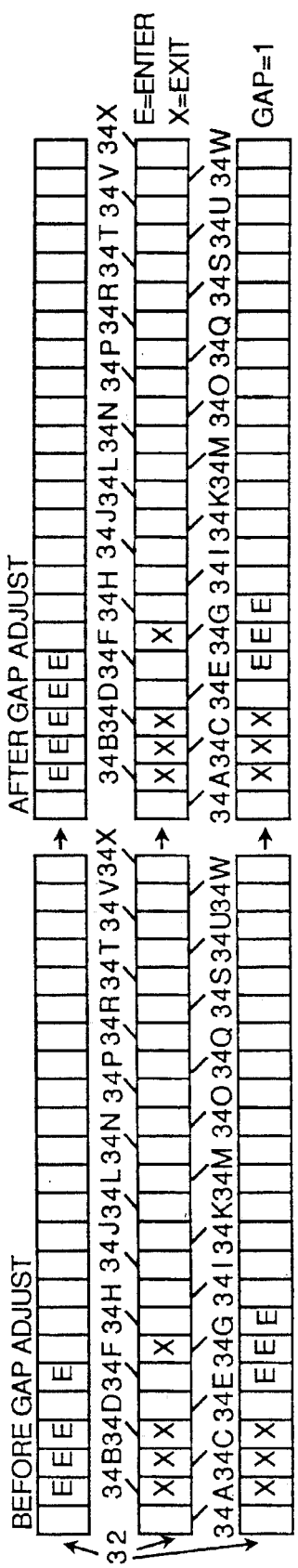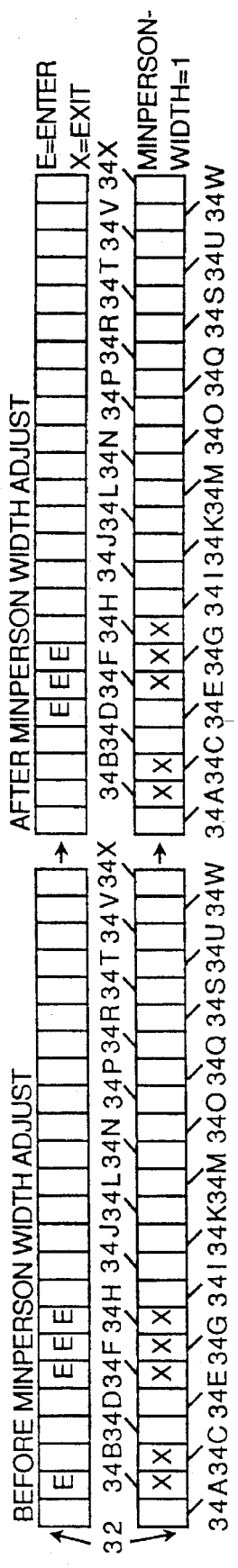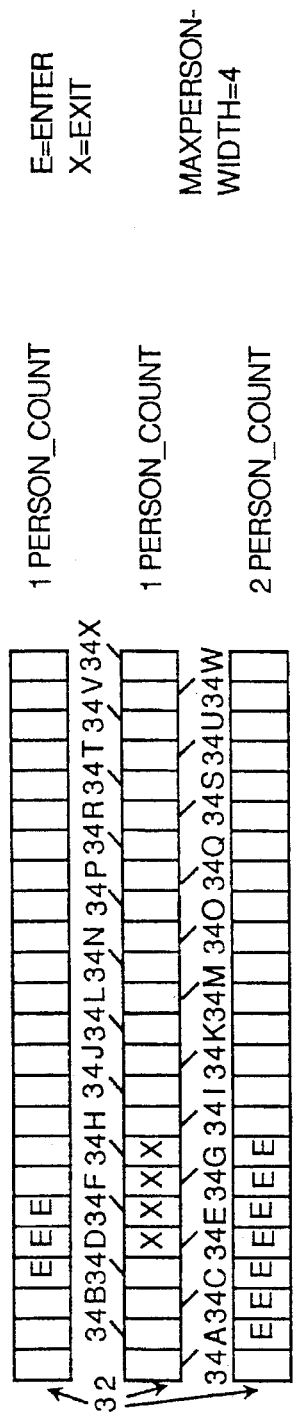
FIG. 4
FIG. 5
FIG. 6

VIDEO TRAFFIC MONITOR FOR RETAIL ESTABLISHMENTS AND THE LIKE

This application is a continuation of application Ser. No. 08/062,306, filed May 14, 1993, now abandoned.

FIELD OF THE INVENTION

The present invention generally relates to the field of video imaging. More particularly, the present invention relates to an apparatus and method for monitoring people simultaneously entering and exiting a heavily travelled pedestrian traffic zone, such as an entrance to a department store or mall.

BACKGROUND OF THE INVENTION

The monitoring of customer traffic in a retail establishment provides valuable information to the management of these establishments. Management can evaluate the effectiveness of advertisements, promotions and events by monitoring the number of customers entering and exiting the retail establishment at certain times. In addition, this information can serve as the basis for staffing and security decisions. Furthermore, accurate customer traffic information can be extremely useful in management discussions with tenants.

Customer traffic information has been obtained in several ways. Individuals can manually count and record the number of people entering a retail establishment. This method, however, is expensive and varies in accuracy depending on the individual. Turnstiles have traditionally provided customer counting information, but turnstiles are inconvenient for many retail applications. Surprisingly, the most common method of obtaining customer information in a retail environment is by car counting.

Car counting involves placing a pneumatic tube or inductive loop at the entrance to a retail establishment that detects cars entering the retail parking area. The customer count is derived from the car count multiplied by an estimate of the number of people per car. Another common technique involves using vertical or horizontal light beams at the entrance to the retail establishment. This technique counts people as they enter the retail establishment and break the light beams, but this technique can be inaccurate. Recently, video imaging or visual imaging systems have been developed that also provide customer traffic information.

Video imaging generally involves the conversion of an image into an array of pixels. Each pixel contains information describing a small component or area of the entire image. By analyzing present and past pixel arrays associated with a particular image, the detection of an object within the particular image and a direction of movement associated with that object is possible.

The science of computer vision has provided a number of approaches to the interesting problem of detecting and tracking moving objects. Some of the tools or algorithms used are auto-correlation, optical flow, edge enhancement, and segmentation pattern matching to mention a few. Most of these approaches deal with the overall scene. As such, two major problems must be solved:

(1) Search—the objects of interest must be identified and isolated as individual targets; and (2) Track—the objects must be traced from their previous position to their present position.

The ease with which the human can perform these tasks belies the difficulty involved to make a computer perform the same task. The human has such a rich abundance of cues to distinguish subtle differences that a human can look away from the scene and then return and identify the location of an object of interest very quickly. The video processor, however, must first determine whether an object of interest actually exists in the image. Once the video processor locates an object of interest, the video processor must track the object of interest through the maze of other objects while being given a constant stream of updates. Unfortunately, the task of searching and tracking objects in this manner requires a lot of computing power which translates into increased costs.

Some visual imaging systems perform object detection and determine the direction of movement for an object at a relatively low cost without powerful computing systems. These systems, however, are quite limited in application. For example, certain systems are limited to detecting objects, such as people, one person at a time. In this way, by limiting the complexity of the system application, these visual imaging systems do not require powerful computing, but these systems cannot function in an environment of multiple objects simultaneously traversing a traffic zone in different directions, such as in a retail environment. Additionally, these systems must perform conventional blob analysis to differentiate between different types of objects, adding to the computing power required. Thus, a need exists for providing a video imaging system that can simultaneously detect a certain type of object, such as people, and determine the directions of motion for those objects but does not require the computing power of previous video imaging systems.

SUMMARY OF THE INVENTION

An object of the present invention is to provide an improved traffic monitoring system for inexpensive, real time monitoring of the number of people simultaneously entering and exiting a retail pedestrian traffic zone, such as an entrance to a shopping mall.

A related object of the invention is to provide such an improved monitoring system which determines the direction of movement of the people, as well as the number of people, traversing the monitored zone.

Another object of the present invention is to provide an improved video traffic monitoring system for accurately monitoring the people simultaneously entering and exiting a retail traffic zone without requiring the computing power associated with traditional video imaging systems.

Still another object of the present invention is to provide an improved video traffic monitoring system for determining a real time count of the number of people currently within a retail establishment or the like.

Other objects and advantages of the present invention will be apparent from the following detailed description and the accompanying drawings.

The video traffic monitor examines customer movement in a retail or similar environment, such as a department store, where people are simultaneously entering or exiting a traffic zone, such as the entrance to the department store. The video traffic monitor provides information relating to the number of people entering or exiting the traffic zone. This customer movement information assists in determining customer traffic flow to determine the effectiveness of advertisements and displays, compliance with fire ordinances or other general customer traffic information. Counting people simultaneously entering or exiting a wide traffic zone using an inexpensive imaging system poses interesting challenges from a computer vision standpoint.

The present invention accomplishes the above objects because the processor of the present invention only analyzes a limited area or window substantially across at least that portion of the image representing the traffic zone rather than analyzing the entire image. Moreover, the present invention does not search for the people traversing across the traffic zone; instead, the people come to the present invention. In this way, the present invention provides video monitoring of a traffic zone, characterized by people simultaneously traversing the traffic zone in different directions, in real time without expensive computing.

In accordance with the present invention, the foregoing objectives are realized by using a video imager located above a busy traffic zone for converting an image including the traffic zone into an analog signal. An image handler, including a signal converter, converts the analog signal into a digital signal representing the image. The image handler stores the digital signal representing the image, and a processor grabs the image, stores it in memory and analyzes those portions of the image forming a window across the image of the traffic zone. The processor also stores the analysis results in memory and displays them.

In a preferred embodiment of the present invention, the window is fairly narrow and oriented such that it is perpendicular to the general flow of the traffic. To simplify the software, the video imager or camera can be oriented directly above the traffic zone so that the window represents a subset of horizontal raster lines of the camera. The size of the window in the direction of traffic flow is such that no more than one person can be present at one time. The window is divided into a number of narrow sectors called gates. These gates are narrow enough so that a person would normally occupy several gates at any one time. When a person is detected entering a gate, the direction in which the person is moving through the gate is determined, and the gate then becomes committed to a given state of enter or exit. Once a gate has been committed, it is not released until it is empty or there are not enough adjoining gates committed to the same state to indicate that a person is present. As the analysis proceeds and it is determined that a person who occupied a set of gates is no longer present, that person is then counted and tallied in accordance with the state (enter or exit) of the gate.

BRIEF DESCRIPTION OF THE DRAWINGS

FIG. 4 shows a gated window of an image and how the present invention treats certain situations in order to improve the robustness of the window image;

FIG. 5 shows a gated window of an image and how the present invention treats certain situations in order to discard noise;

FIG. 6. shows a gated window of an image and how the present invention treats certain situations to determine the amount of people in a person block;

DETAILED DESCRIPTION OF THE PREFERRED EMBODIMENTS

Figure 1:
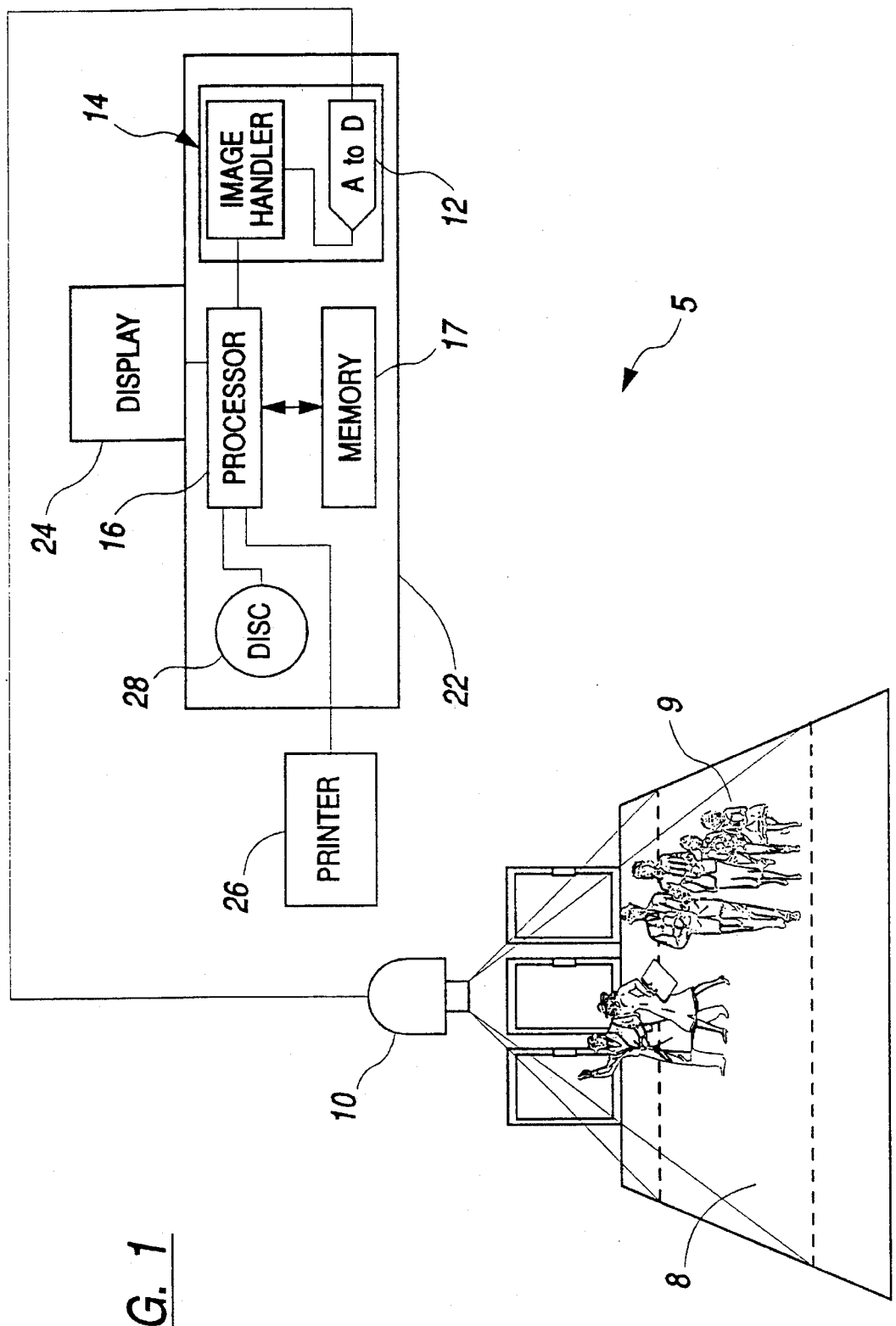
FIG. 1 illustrates a video traffic monitor in accordance with the present invention.

Referring now to the drawings, and more particularly to FIG. 1, there is illustrated a video traffic monitor in accordance with the present invention, generally designated by the reference numeral 5. The video traffic monitor 5 counts people traversing across a traffic zone 8 by utilizing a CCD camera or video imager 10. The video imager 10 rests above the traffic zone 8 and converts an image including the traffic zone 8 into an analog signal. The traffic zone 8 is a wide zone of reasonably restricted retail traffic flow, such as the entrance to a department store or shopping mall. The traffic zone 8 is characterized by multiple people 9 simultaneously entering and exiting the traffic zone 8. A dynamic environment such as the traffic zone 8 creates significant problems from a video imaging standpoint, but the video traffic monitor 5 effectively counts people entering and exiting the traffic zone 8 without massive computing.

The video traffic monitor 5 includes an image handler 14 that is conventionally coupled to the video imager 10. The image handler 14 includes a signal converter 12, such as a video A to D converter, for converting the analog signal from the video imager 10 to a digital signal representing the image. The image handler 14 also stores the digital signal as an image array (not shown). A processor 16 permits the video traffic monitor 5 to effectively count people in this dynamic retail environment. The processor 16 only analyzes portions of the image forming a window across the image of the traffic zone 8 rather than the entire image, determines if objects of measurement or people 9 are entering or exiting the traffic zone 8 and counts the people 9 as either exiting or entering the traffic zone 8. A display 24 or a printer 26 displays the counting results. As shown, the video imager 10 couples with a personal computer 22. The personal computer 22 includes the image handler 14 (including the signal converter 12) or frame-grabber board and the processor 16, preferably a 33 Mhz 486 microprocessor along with associated memory 17. Results can also be stored on a disc 28.

Figure 2:
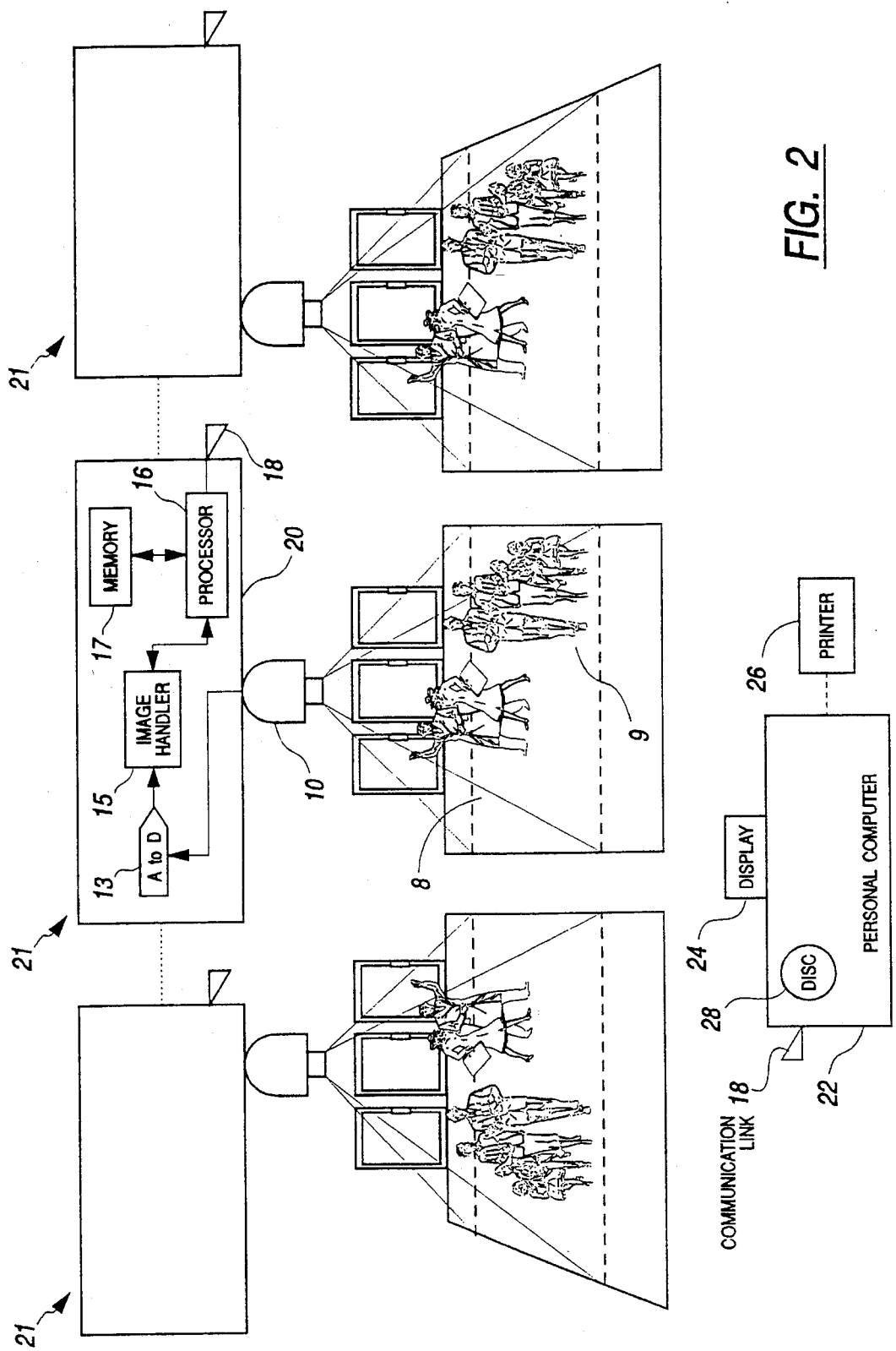
FIG. 2 illustrates a preferred embodiment of the video traffic monitor of the present invention.

In a preferred embodiment, FIG. 2 shows a housing 20 that holds the video imager 10, a signal converter 13, an image handler 15, a processor 19 and associated memory 23 for the processor 19 together in a portable video traffic monitor 21. The processor 19 can be a DSP processor, such as a DSP controller #TM532OC3OGBO sold by Texas Instruments, on a dedicated board with storage memory 23. The image handler 15 and the signal converter 13 can be a conventional frame-grabber board. The image handler 15 can also be a custom frame-grabber board, and the signal converter 13 can be a video analog to digital converter. A communication link 18 couples the portable video flow monitor 21 with a personal computer 22. FIG. 2 shows the communication link 18 as a radio link. The link 18 can also be an infrared link or a conventional RS-232 or RS-485 connection. The personal computer 22 receives counting data from the portable video traffic monitor 21, manipulates the data and displays the results on the display 24 or the printer 26. The results can also be stored on the disc 28. The portable video traffic monitor 21 provides flexibility by permitting an operator to easily remove the portable video traffic monitor 21 and re-install it over another traffic zone.

Figure 3:
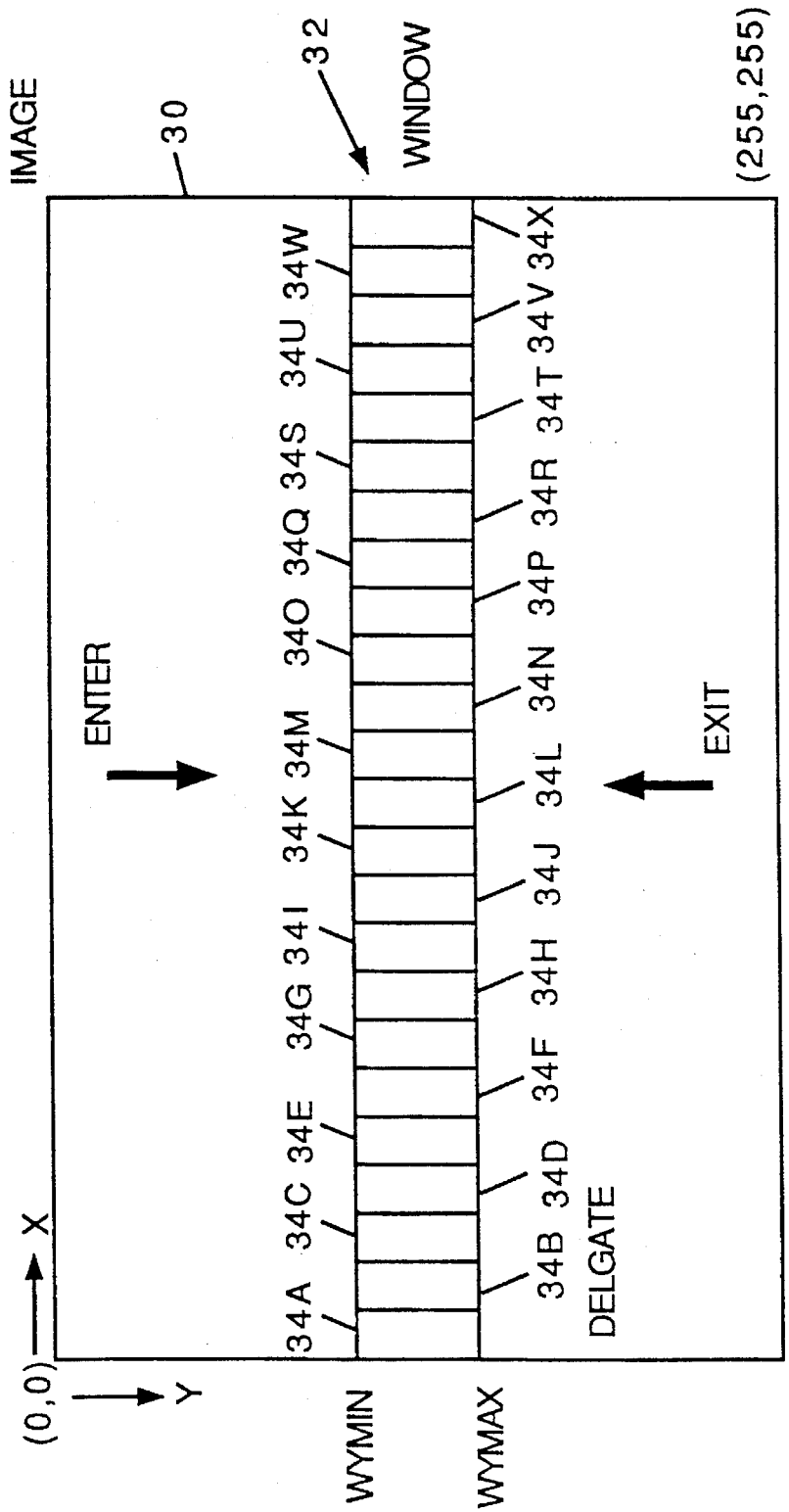
FIG. 3 shows an image of a traffic zone, acquired by the video imager, and the various components of the image.

The video traffic monitor 21 of the present invention must function in real time. The more complex and involved a process becomes, the more compute power is required for the illustrative video flow monitors 10, 21 to run in real time. To provide a marketable, inexpensive hardware implementation, analysis of the image is preferably confined to a narrow window substantially across at least that portion of the image representing substantially the entire traffic zone 8. FIG. 3 illustrates an image 30 which includes a narrow window 32. In FIG. 3, the image 30 represents substantially the entire traffic zone 8, and window 32 is shown as being entirely across the image 30 representing substantially the entire traffic zone 8. The window 32 can be an array of disconnected portions of the image 30. Typically, as stated above, the traffic zone 8 is a wide area near the entrance of a shopping mall or department store. This limited window analysis significantly reduces the number of pixels to be analyzed. Thus, the illustrated video traffic monitors of FIGS. 1 and 2 can effectively and inexpensively monitor a wide traffic zone 8 having many objects or persons 9 simultaneously entering and exiting the traffic zone 8 by restricting analysis to the narrow window 32.

The illustrative system also does not require a high resolution image, further reducing the required computing power for the illustrative monitor. In a preferred embodiment, a frame-grabbing board having a high resolution 512×512-pixel mode, as well as a 256×256-pixel mode, is used. The 256×256-pixel mode is achieved by using a slower sampling rate per horizontal scan and by acquiring only one of the two fields of an interlaced frame. Use of full-frame resolution requires 33 milliseconds for acquisition of the full interlaced image, even with the subsampling of the required image to reduce the number of pixels used in the analysis. But only 16 milliseconds are required for the frame grabber to provide a working image in only one field, thereby making available 17 milliseconds of processor time for other functions.

A preferred embodiment uses 256 pixels per horizontal scan line times the number of scan lines in a window 32 of an image 30. There is a limit as to how narrow the window 32 can be made due to the cycle time of the present invention, the scale factor of the pixel, and the velocity of the traffic as illustrated by the relationship:

$$NL = \frac{W_w P_s}{VT} \quad (1)$$

where:

NL=the number of "looks" or cycles for a person in the window;
$W_w$=window width (pixels);
$P_s$=pixel scale factor(ft/pixel);
V=velocity of person (ft/s);
T=cycle time (s).

Faster objects or slow cycle times can be compensated for by a wider window and/or a larger pixel scale factor. The pixel scale factor, $P_s$, is controlled by the CCD sensor width, $S_w$, the focal length, F, of the camera lens, and the distance, D, of the lens from the subject, in the relationship:

$$P_s = \frac{D S_w}{F 256} \quad (2)$$

where:

$P_s$=pixel scale factor(ft/pixel);
D=subject distance (ft);
F=lens focal length (mm);

$S_w$=CCD sensor width (mm).

As a practical example, a "⅔ inch" camera has a CCD sensor width, $S_w$, of 8.8 mm with a lens focal length, F, of 6 mm and a camera overhead distance, D, of 12 feet, providing a pixel scale factor, $P_s$, of 0.0688 ft/pixel. For a window width, $W_w$, of 2 feet (or 29 pixels) and a velocity, V, of 5 ft/s, a four-look criteria requires a 100-millisecond cycle time. This cycle time can be reduced by making the window wider. A wider window, however, can allow the possibility of two people (one in back of the other) being in a gate at one time and complicating the analysis.

The look criteria can be reduced, but normally at least two looks are required to determine the direction a person is traveling. The velocity of 5 ft/s is not slow, but 7 ft/s is possible for people in a hurry. The focal length of the camera lens can be reduced, but the camera lens will begin to become a "fisheye" lens. The camera distance, D, can be increased as allowed by the ceiling height.

In FIG. 3, the window 32 stretches entirely across the image 30 because the image 30 represents the entire traffic zone 8. Alternatively, if the image 30 represents more than the traffic zone 8, the window 32 only needs to stretch across that portion of the image 30 representing the traffic zone 8. Moreover, the window 32 can be an array of disconnected portions of the image 30 where an area between the disconnected portions represents a non-traffic area, such as a fountain at the entrance to the mall. The window 32 is preferably oriented such that it is perpendicular to the general flow of traffic through traffic zone 8. The window 32 can be moved to any position within the image 30, but the preferred position for window 32 is such that the people are viewed from directly overhead. The preferred position for the window 32 requires that the video imager 12 be oriented directly above the traffic zone 8. This configuration is preferred because the changing shape of the human body, with moving arms and legs, poses an extra degree of difficulty for the analysis than would be presented by a rigid body. The human body resembles a rigid body when viewed from overhead. Thus, placing the window 32 directly overhead minimizes some of the difficulties for the chosen approach and, therefore, reduces the required computing power for the illustrative systems.

The preferred system uses two parameters for establishing the position of the window 32 on the image 30. As illustrated in FIG. 3, WYMIN and WYMAX establish the position and dimensions of the window 32. In a preferred embodiment, the window 32 is 30 pixels wide, which represent about 2 feet. The upper left-hand corner of the image 30 is designated as the origin with coordinates (0,0) in pixels. The x-axis coordinates increase horizontally up to 255, and the y-axis coordinates increase with each horizontal scan line up to 255, resulting in the lower right-hand corner of the image 30 having coordinates (255,255).

As shown in FIG. 3, the window 32 is divided into gates 34a–x. The gates 34a–x provide a logical structure upon which to determine the status of objects traversing the window. In the general sense the gates 34a–x are of a binary nature, either empty or occupied. When the object of measurement is people, an occupied gate represents the presence of one person because the dimension of the window 32 in the direction of people movement is only about as wide (WYMAX–WYMIN) as one person. Due to the variability of the human form, the variations in size, and a number of issues related to providing a robust solution, it is advantageous to make the gate dimension in the direction transverse to the direction of people movement less than a normal-sized person. This means that a number of gates will be occupied by one person. This structure provides the means for making the discriminations necessary to reduce erroneous results. Alternatively, certain gates can be "turned off," creating a disconnected window in order to avoid analyzing a non-traffic area, such as a fountain or other obstacle within the traffic zone. In addition, by "turning off" or ignoring certain gates such as every other gate, the amount of pixels for analysis is further reduced. A person skilled in the art can alter the processor analysis of the illustrative system to effectively analyze a disconnected window.

Even though the window is relatively narrow in the direction of people movement, it is still possible for a person to cross the window diagonally and appear to occupy a moving number of gates in the process of traversing the window. By using a number of gates to define a single person, the person can still be monitored or counted as he moves across the gates 34a–x.

Due to the variable character of the human body and depending upon the robustness of the human form as defined by the present method, a contiguous set of occupied gates may not be produced for a given person. In other words, a person may occupy three contiguous gates, but the system could only detect a form in the two outside gates, possibly due to the color of that person's clothing. The preferred system fills in these voids without precipitating the error of "creating people."

Additionally, the preferred system utilizes a method to avoid the error of "deleting people" where contiguous sets of gates represent more than one person. In crowded situations where people are very close, contiguous sets of gates can be occupied by more than one person. The preferred system accommodates this possibility.

All systems have a noise level which is usually eliminated by a threshold signal level such that pixel values (ranging from 0–255 in the illustrative system) below the threshold level are considered noise and those pixel values above the threshold level represent a potential person. Setting the threshold level too high, however, can cause the system to miss a valid event, and setting a threshold level too low can cause the system to count an invalid event. The identification or isolation of a person within the window uses thresholding criteria. To prevent missing or reducing the robustness of the human form, a threshold level is selected that permits a certain amount of noise or gate ambiguities. The preferred system or method handles this noise or gate ambiguity as described below.

Several parameters are used to accommodate the above correction methods. These parameters are:

(1) DELGATE gives the width of a gate in pixels as shown in FIG. 3;

(2) GAP represents the maximum gap or void which is to be filled in between gates of equal status, i.e., tagged as being occupied by an entering or exiting person. FIG. 4 gives some examples of what a GAP value of 1 does to a given set of gate states;

(3) MINPERSONWIDTH specifies the maximum number of contiguous gates of a given occupied state which is considered a noise level and is eliminated or reset to an empty state. FIG. 5 gives some examples of what a MINPERSONWIDTH of 1 does to a given set of gate states; and (4) MAXPERSONWIDTH gives the maximum number of contiguous gates of a given occupied state which is considered to be one person. A fractional round up is implemented in the method. FIG. 6 gives some examples of what a MAXPERSONWIDTH of 4 does to a given set of gate states.

The preferred system isolates an object for analysis by subtracting consecutive cycle images. This method of isolation is effective because the background in the image 30 is fixed and the people 9 are moving. Thus, the previous cycle image acts as a reference image for detecting changes in the current image due to people moving across the window. The robustness of the resulting image is dependent upon the cycle time or how fast the person is moving. Consequently, the robustness of the image can suffer if the cycle time is too fast because subtraction only creams an outline form of the person reflecting the amount of displacement since the previous cycle.

The subtraction of two frames results in values which can vary from −255 to +255. Since the positive or negative nature of a difference does not enhance the detection capability, the difference is taken as an absolute value, giving a resultant range of 0 to 255. The magnitude of the difference reflects the contrast difference existing between consecutive cycle images. The contrast levels will change from person to person depending on a variety of factors, such as the color of the person's clothes and the color of the floor or background. In fact, the contrast levels will even change for a given person. Consequently, an array of difference values or a DIFFERENCE image array is not conducive to a simplified approach for determining a person's direction of motion such as measuring the displacement of the center of mass. Thus, it is preferred to convert the difference value array into binary form, creating a BINARY image array such that the object or person has uniform characteristics. Giving the person uniform characteristics permits a simplified approach for determining a person's direction.

Figure 7:
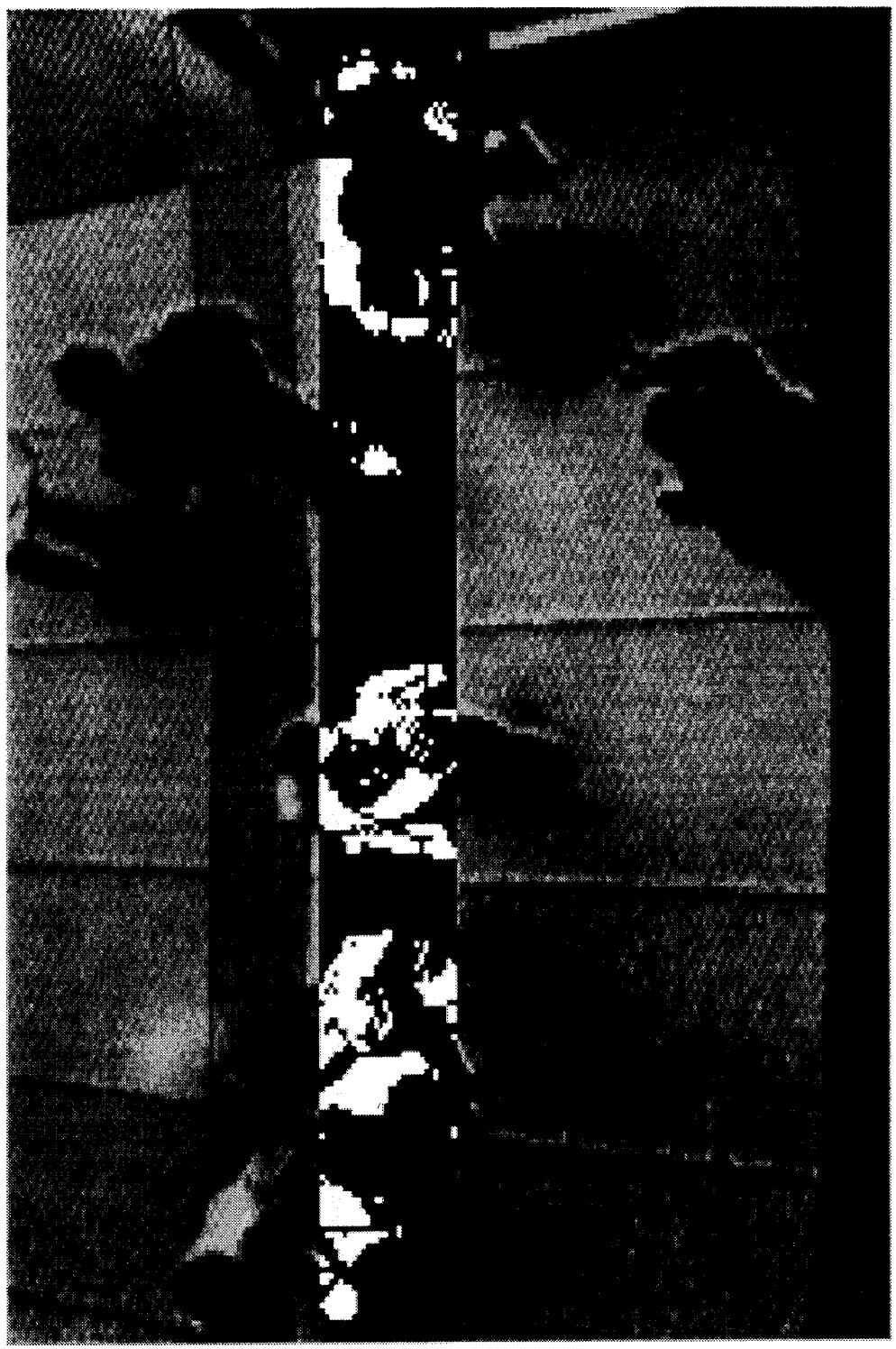
FIG. 7 illustrates an image of a traffic zone with a window as a binary image.

To eliminate noise, the threshold level is selected for the array of difference values. Difference values below the threshold level are set to 0, and difference values above the threshold level are set to 1. In this way, the BINARY image array is constructed from the DIFFERENCE image array. The appearance of the resulting BINARY image array is shown in the window 32 of FIG. 7.

During each cycle of the preferred system, the values within the BINARY image array within each gate 34a–x are summed. This sum represents the mass of an object in the gate. To avoid noise, the sum of the BINARY image array values for a gate must exceed a trip sum level before a person is recognized as occupying that gate. The parameters used to implement the above detection techniques are:

(1) THRESHOLD is a difference or contrast level (0–255) for establishing a binary image array; and (2) TRIP is a pixel count threshold within a given gate to signal the presence of a person in the gate, and, since the gate size varies with the window width and the gate width, this term is more properly specified as a percentage of the gate.

In addition to counting the number of people traversing the windowed area, it is necessary to determine the direction they are going, i.e, entering or exiting. This determination is made on a per gate basis and has the additional function of assisting in the discrimination logic. The direction of movement of a person through a gate is determined by comparing the center of mass for two consecutive cycles. When the presence of a person within a gate is first detected (gate binary image sum >TRIP), the gate is put into a HOLD state, and the system determines the center of mass and specifies it as YBAR, i.e., the y-axis position of the center of mass. YBAR is calculated as follows:

$$YBAR = \frac{\sum\limits_{y=WYMIN}^{WYMAX}\left(y \cdot \sum\limits_{x=X_{g1}}^{X_{g2}} \text{Binary image array }(x,y)\right)}{\sum\limits_{y=WYMIN}^{WYMAX}\sum\limits_{x=X_{g1}}^{X_{g2}} \text{Binary image array }(x,y)} \quad (3)$$

where: $X_{g1}$ and $X_{g2}$ define the x limits of the gate; and WYMIN and WYMAX define the y limits of the gate.

In the next cycle a new YBAR is determined, and the difference between the present and past YBAR values determines the direction of movement. The gate is then changed to an ENTER or EXIT state accordingly.

FIGS. 8 through 16 illustrate a flow chart diagram of the processes of a preferred embodiment of the present invention running on the processors of the illustrative systems.

Figure 8:
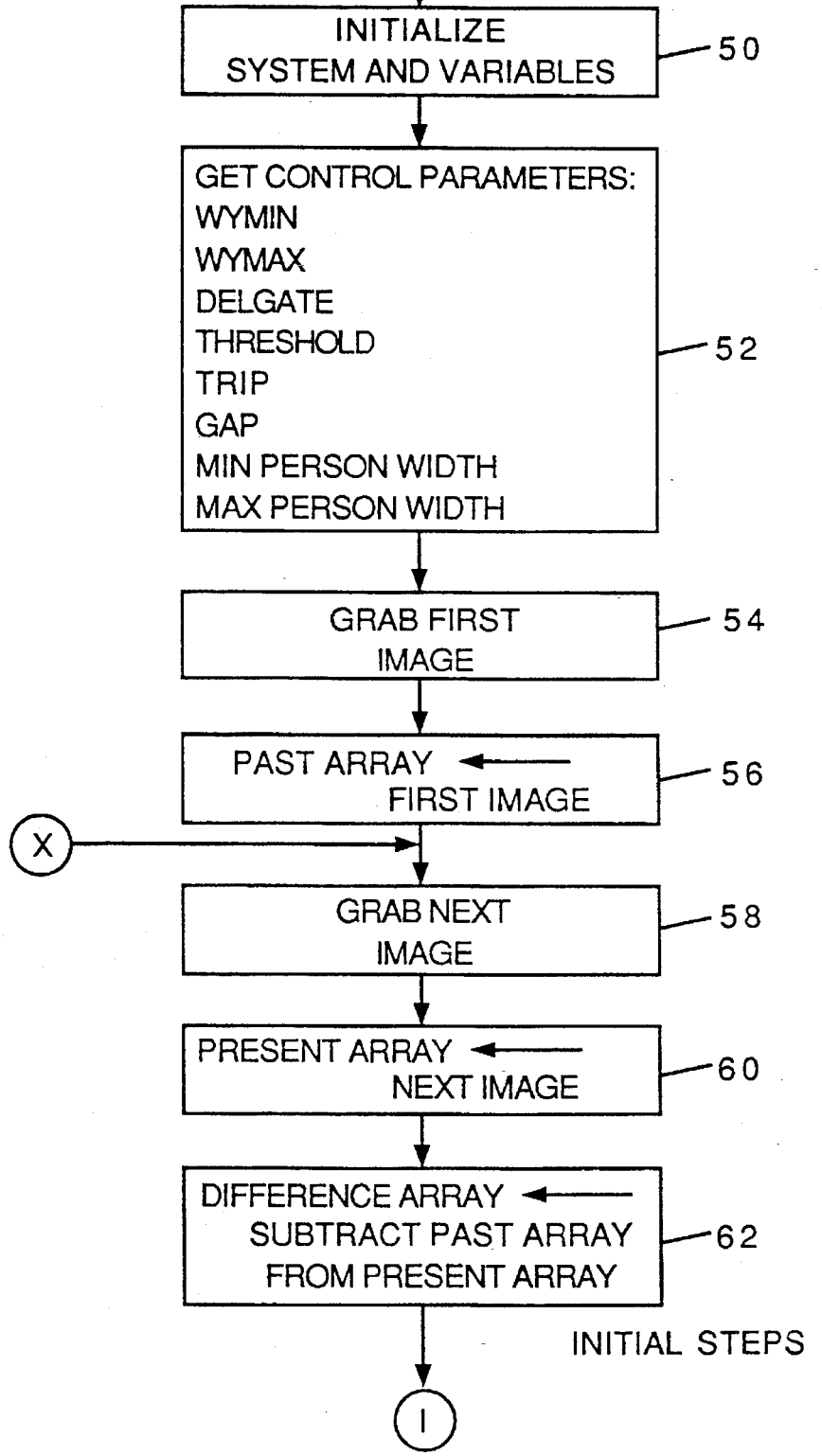
FIGS. 8–16 illustrate a flow chart diagram of the processes running on the processor of a preferred embodiment of the present invention.

In FIG. 8, step 50 initializes the video traffic monitor and certain variables. An operator locates the camera 10 directly above the people traffic and orients the camera such that the scan lines are orthogonal to the general traffic flow. Initially, the processor must check for the presence of an image handler, such as frame grabber board, and for a video input signal. The processor initializes the frame grabber board registers and sets the frame grabber board to the low resolution 256× 256 pixel mode. Finally, the processor sets the People Count to zero for enter and exit states.

The video traffic monitor requires certain control parameters in order to operate effectively. Step 52 of FIG. 8 obtains these control parameters from an input file or from the operator. The processor checks for a file name input from the command line. If the file name exists, then the processor reads parameters from the file; otherwise, the processor prompts the user for each parameter.

Step 52 obtains the control parameters defining a window and gates. WYMIN and WYMAX represent the scan line limits (0–255) at the start and end of the window area. These variables define the position of the window 32 in the image 30 and the width of the window 32 (WYMAX–WYMIN) in the direction of people movement as shown in FIG. 3. The width of the window should be about the size of a single person or an object of measurement. DELGATE defines the width of a gate in pixels (0–255) in the direction transverse to the direction of people movement. A single person or an object of measurement should occupy at least three or four gates.

Step 52 also obtains several parameters used to eliminate noise from the analysis. THRESHOLD is the threshold difference value level used to create the binary image array. The threshold level should be set just above the empty-window noise level such that the binary image array is not adversely affected by noise. TRIP is the gate sum threshold used to indicate the presence of a person in the gate. The gate sum represents the number of pixels above THRESHOLD in a given gate. The total number of pixels in a gate is (WYMAX– WYMIN)*DELGATE. The trip threshold value should be high enough to eliminate noise and the effects of a non-rigid body, such as a hand or foot moving into a gate, but not high enough to miss a person due to a weak or thin outline from the binary image.

Step 52 retrieves certain parameters that improve robustness and accuracy. For instance, GAP defines the maximum gate gap used to fill in voids. An empty gap between two bracketing enter or exit states is set to the bracketing state to add robustness to the binary difference image result. The gap value should be equivalent to a fraction of a single person and is given as a number of gates. Step 52 obtains MINPERSONWIDTH to eliminate noise or spurious gates. This parameter represents the minimum number of contiguous enter or exit gates required for the detection of a person. If a person is not present, these enter or exit gates are reset. This value can be equivalent to a fraction of a single person. Finally, MAXPERSONWIDTH is used to determine how many people are present within a contiguous set of enter or exit gates. This value can be equivalent to the average width of one person.

After setting the control parameters, step 54 grabs the first image, and step 56 places the first image in a past IMAGE array. This image is acquired from the camera by the frame grabber and is the first image to be used in the process. At step 56, the image stored in the past IMAGE array from the frame grabber is only the window area and has a grey scale distribution represented by the 256 grey levels of the frame grabber digitizer. The number of pixels in this image is 256*(WYMAX–WYMIN). This image represents the past IMAGE for the first difference image result.

Step 58 grabs the next image, acquired from the camera by the frame grabber. Step 60 places the next image into a present IMAGE array, also used in constructing the DIFFERENCE image array. At step 60, the image stored in the present IMAGE array is for the window area only and also has the 256 grey scale levels of the frame grabber digitizer.

Finally, step 62 constructs the DIFFERENCE image array. For each pixel in the window image, step 62 subtracts each element in the past IMAGE array from the corresponding element in the present IMAGE array and stores the result in the DIFFERENCE image array. These values can range from –255 to +255.

Figure 9:
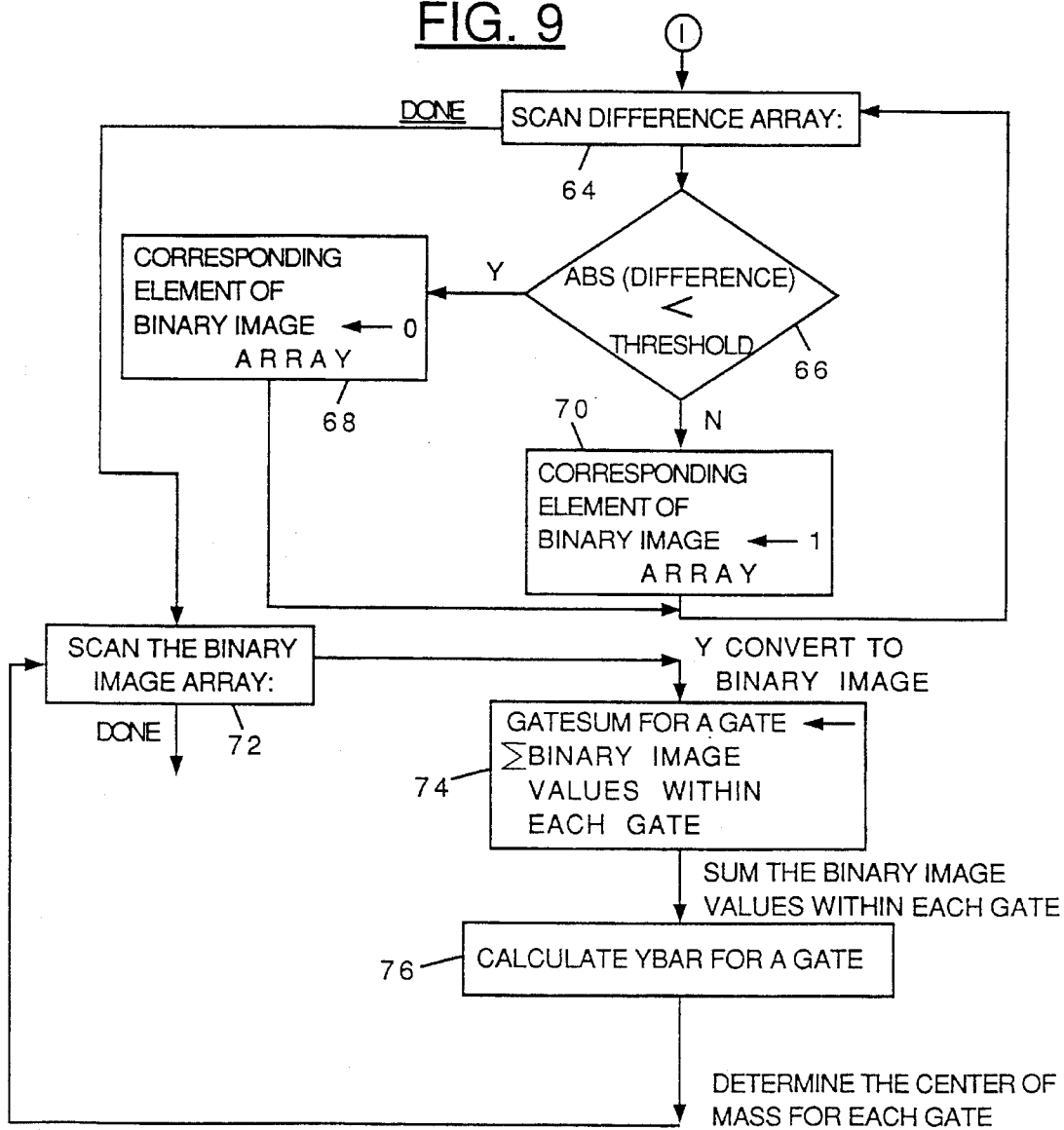

FIG. 9 shows how the DIFFERENCE image array is converted into a BINARY image array, and GATESUM and YBAR are calculated from the BINARY image array. Step 64 represents a loop starting at the first element of the DIFFERENCE image array to the last element. For each element or pixel in the DIFFERENCE image array, step 66 compares the absolute value of that element or difference value with the THRESHOLD level. If the absolute difference value for any given pixel of the DIFFERENCE image array is above the THRESHOLD level, step 68 assigns a "1" to the corresponding element of the BINARY image array. If the absolute difference value for any given pixel is below the THRESHOLD level, step 70 assigns a "0" to the corresponding element of the BINARY image array.

Step 72 establishes a loop for traversing the BINARY image array to calculate GATESUM and YBAR for each gate. Step 74 calculates GATESUM, which is a count of the number of above-THRESHOLD pixels present within the gate. In other words, step 74 calculates GATESUM for each gate by summing together all those binary values in the BINARY image array within each gate. When this sum is tested against the TRIP value, a determination is made as to whether the gate is occupied or empty.

After determining GATESUM for a gate, step 76 determines the center of mass for that gate or YBAR for that gate according to Equation (3). In the BINARY image array, each pixel has a mass of 1 or 0. The center of mass in the Y direction or YBAR determines the position of the person within the gate in the direction of traffic flow. In this case the center of mass or YBAR represents the average Y position of all the pixels with a value of 1 in the gate. Thus, the binary process allows this determination to be made on shape rather than the weighted effect of image contrast that would occur if the difference results in the DIFFERENCE image array were used to calculate YBAR. When the center of mass is compared in consecutive process cycles, the direction of movement of this center of mass represents the direction of movement of the person in the gate.

Figure 10:
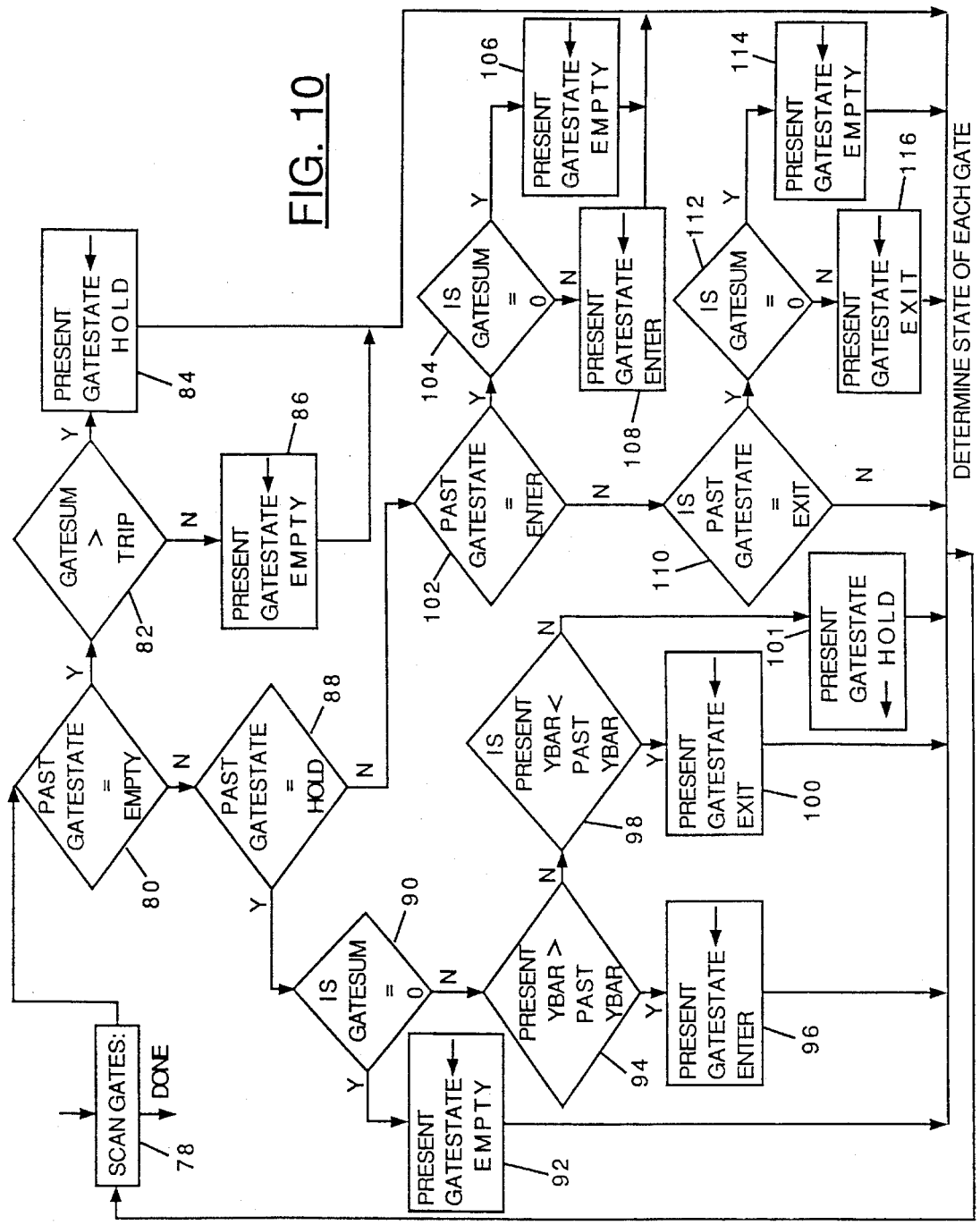

FIG. 10 is a flow chart diagram for determining the state for each gate. Step 78 sets a loop for scanning each gate. Each gate has a GATESTATE, a GATESUM and a YBAR. The GATESUM must get above the TRIP level before an EMPTY gate will transition to a HOLD, ENTER, or EXIT status, insuring a certain robustness before committing the gate. The binary process means that this GATESUM and TRIP level are based on the size of the shape in the gate rather than being weighted by the contrast levels or difference values in the DIFFERENCE image array. Once a gate has passed the TRIP level and the direction of movement determined, the gate remains fixed to the ENTER or EXIT state until its GATESUM falls to zero, thus, giving a hysteresis stabilizing affect. The gate can be brought to an EMPTY state prior to this if it is found to be an isolated or noise gate by subsequent analysis.

Step 80 checks whether the past GATESTATE is EMPTY. If so, step 82 compares the present GATESUM with the TRIP value. If the GATESUM is greater then the TRIP value, then step 84 sets the present GATESTATE to HOLD; otherwise, step 86 sets the present GATESTATE to EMPTY. The HOLD state is used to indicate the first instance of occupancy. The HOLD state defers the decision for ENTER or EXIT status until the next cycle when the center of mass movement is determined.

Step 88 determines whether the past GATESTATE is HOLD. If so, step 90 checks the present GATESUM. If the GATESUM is greater then zero, then the present YBAR or center of mass is compared to the past YBAR or center of mass in steps 94 and 98 to determine the direction of movement, and step 98 or 100 accordingly sets the present GATESTATE to ENTER or EXIT depending on the direction of movement. If YBAR or the center of mass has not moved, then step 101 keeps the present GATESTATE in the HOLD state for the next cycle. If GATESUM is zero, step 92 sets the present GATESTATE to EMPTY.

Step 102 determines whether the past GATESTATE is ENTER. If the past GATESTATE is ENTER, step 104 checks the present GATESUM. Only if the GATESUM is zero does step 106 set the present GATESTATE to EMPTY; otherwise, step 108 keeps the GATESTATE as ENTER.

Step 110 checks whether the past GATESTATE is EXIT. If so, then step 112 checks the present GATESUM. If the GATESUM is zero, step 114 sets the present GATESTATE to EMPTY; otherwise step 116 keeps the GATESTATE as EXIT.

Figure 11:
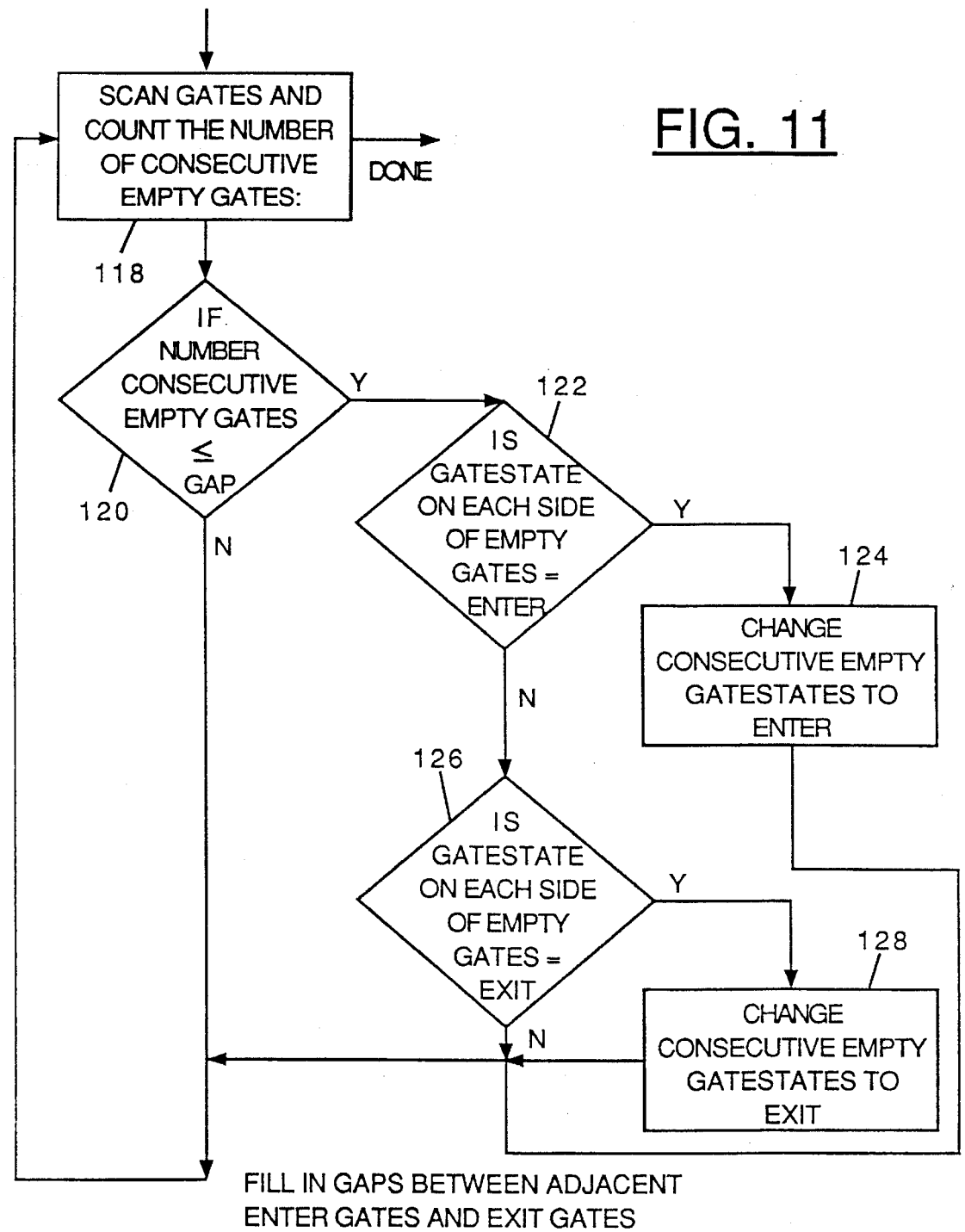
Figure 12:
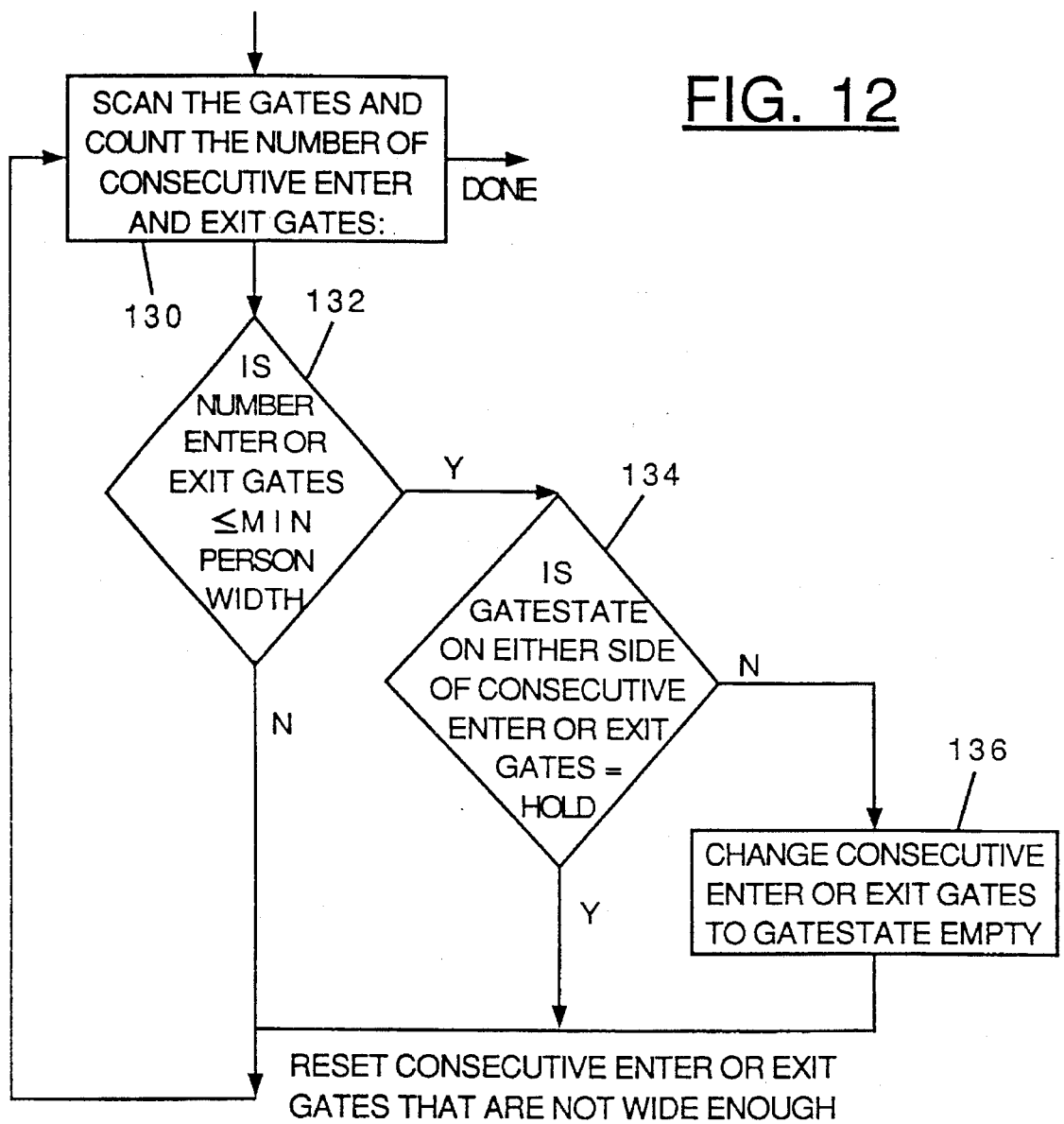
Figure 13:
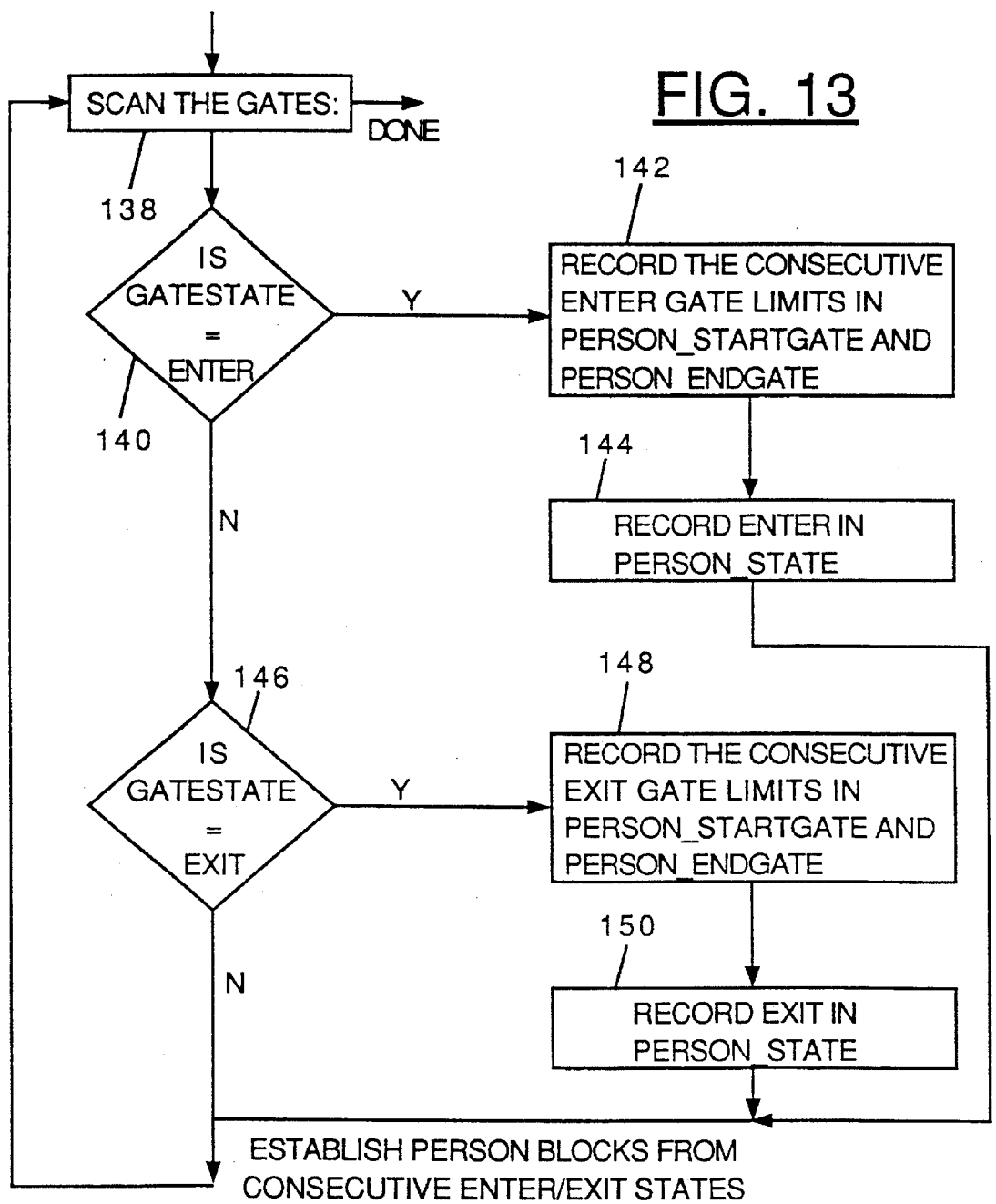

FIG. 11 illustrates a subroutine for improving the robustness of the window image. The BINARY image array used to establish the present gate states may not have people who are robustly connected due to poor contrast, e.g., where the color of a person's clothes matches the floor. To enhance the person's presence and prevent the fragmented pieces from being eliminated as noise later in the analysis, a gap of a maximum size is filled in when the state is the same on both sides of the gap. To accomplish this, step 118 establishes a loop in which the present GATESTATES are scanned and the gap sizes noted. Gaps are defined as the number of contiguous empty gates.

Step 120 compares the number of contiguous EMPTY gates with GAP. If the number of contiguous EMPTY gates is less than or equal to GAP, step 122 checks the GATESTATE at each end of the gap. If both ends are ENTER GATESTATEs, step 124 sets the gap gates to ENTER. Step 126 checks whether both ends of the gap are EXIT GATESTATEs, and, if so, step 128 sets the gap gates to EXIT.

The potential exists for combining two or more people together into a contiguous set of ENTER or EXIT gates. This is acceptable because later portions of the algorithm account for this possibility.

Choosing THRESHOLD and TRIP values that provide increased sensitivity for low contrast cases can result in spurious or noise gates. When noise gates are not supported by adjacent gates to indicate the presence of a person, they are reset to the EMPTY state. To accomplish this in FIG. 12, step 130 scans the present gate states and notes the number of contiguous ENTER and EXIT gates. Step 132 checks whether a contiguous set of ENTER or EXIT gates is less than or equal to MINPERSONWIDTH. If so, step 136 resets them to EMPTY unless step 134 determines that the contiguous set of gates are adjacent to a HOLD gate on either side. If an adjacent HOLD gate exists, the gates are not modified so that the next cycle can resolve the HOLD gate status and potentially create a contiguous set which is larger than MINPERSONWIDTH.

At this stage the present gate states represent the status of the people in the window area. The contiguous gate states are collected into person blocks to determine how many people are in the block and whether anyone has left the window from the past cycle. To accomplish this in FIG. 13, step 138 establishes a loop to scan the gates. Step 140 checks if a gate has an ENTER GATESTATE, and step 142 records the start and end gates of the contiguous ENTER gate set in PERSON_STARTGATE and PERSON_ENDGATE. Step 144 creates a person block for each contiguous ENTER gate set and sets the PERSON_STATE to ENTER. Step 146 determines whether the gate has an EXIT GATESTATE. If the gate has an EXIT GATESTATE, step 144 records the start and end gates of the contiguous EXIT gate set in PERSON_STARTGATE and PERSON_ENDGATE. Step 150 creates a person block for each contiguous EXIT gate set and sets the PERSON_STATE to EXIT. Steps 144 and 148 set PERSON_STARTGATE and PERSON_ENDGATE to the limits of the contiguous gates, each gate having an ordinal number in the window.

Figure 14:
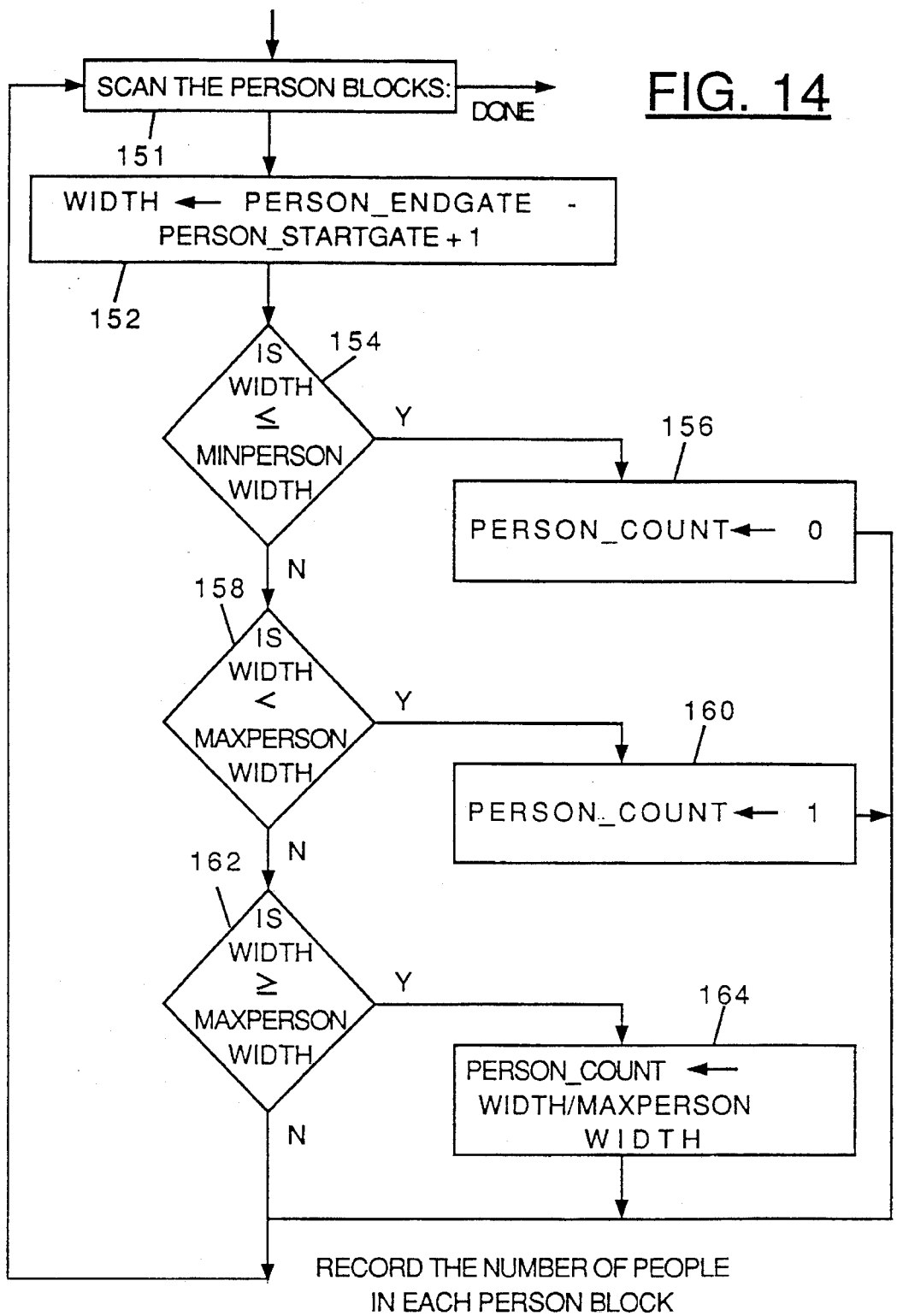

FIG. 14 shows how the number of people is determined from the person blocks. Step 151 establishes a loop to scan the person blocks. Step 152 determines the width of each block by PERSON_ENDGATE–PERSON_STARTGATE+1. Step 154 checks if this width is equal to or less than MINPERSONWIDTH, and, if so, step 156 sets PERSON_COUNT to zero. This occurs if a contiguous set of gates have an adjacent gate of HOLD status which prevent it from being eliminated as too small. By setting PERSON_COUNT to zero, this person block will not generate a People Count if it disappears on the next cycle. If the person block width is greater than MINPERSONWIDTH but less than MAXPERSONWIDTH as determined by step 158, then step 160 sets PERSON_COUNT to one. Finally, if the person block width is greater than MAXPERSONWIDTH as determined by step 162, then step 164 divides the person block width in gates by MAXPERSONWIDTH to determine the number of people in the block. Step 164 rounds up the number of people in the block such that 2.5 will give a PERSON_COUNT of 3.

Figure 15:
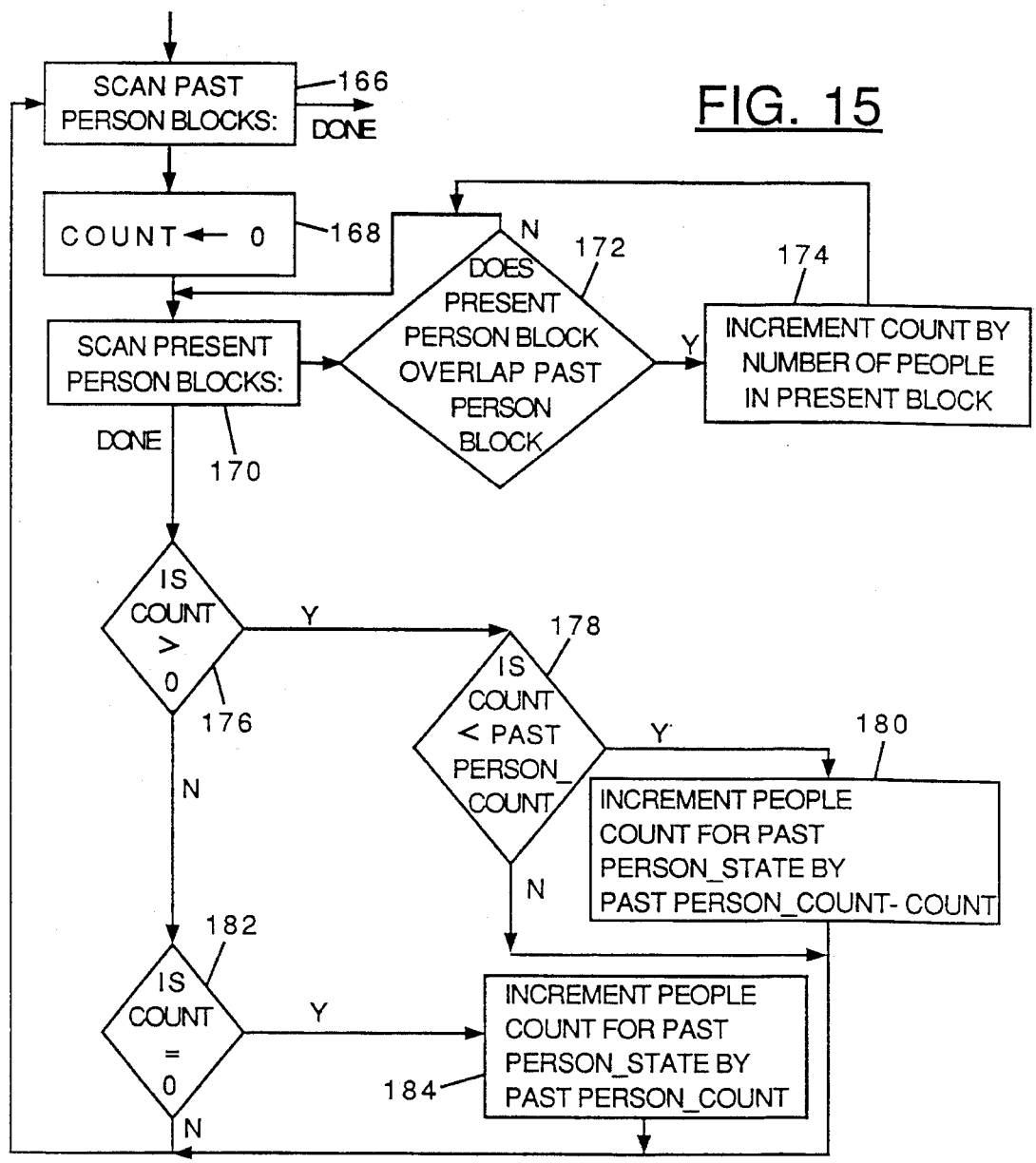

FIG. 15 illustrates a subroutine for determining whether any people have left the window by comparing the past person blocks to the present person blocks. Step 166 creates a loop for scanning the past person blocks. For each past person block, step 168 initializes a counter, COUNT, to zero, and block 170 scans each present person block.

If the present person block has the same state (ENTER or EXIT) as the past person block, then step 172 checks whether the present person block overlaps the past person block. Due to the fast cycle time, the confined space of the window analysis area, and the general flow of traffic parallel to the gates, it is assumed that a person's image will overlap from the past to the present cycle and thus provide a means of tracking the person through the window and logically determining when that person has left the window to be counted. The overlap condition is false when present PERSON_ENDGATE<past PERSON_STARTGATE or present PERSON_STARTGATE>past PERSON_ENDGATE. If no overlap between the present person block and the past person block occurs, then the next present person block is checked by returning to step 170. If an overlap does occur, then step 174 increments the COUNT value by the present PERSON_COUNT.

After step 170 has scanned all the present person blocks for a given past person block, step 176 checks the COUNT value. If COUNT is greater than zero, then step 178 determines whether COUNT is less than the past PERSON_COUNT. If so, then one or more people in a multiple person block have left the window, and step 180 increments the People Count by past PERSON_COUNT_COUNT for the past PERSON_STATE. If COUNT is zero as determined by step 182, then the past person block has left the window, and step 184 increments the People Count by the past PERSON_COUNT for the past PERSON_STATE.

The illustrative system takes into account the case where a multiple person block in the past becomes a number of single person blocks in the present, and no People Count is incurred if the total present people contained in COUNT equals the past PERSON_COUNT of the multiple person block. If a number of single person blocks in the past combine to a multiple-person block in the present, no change occurs in People Count because COUNT is greater then PERSON_COUNT for each of the single overlapping past-person blocks, and the next cycle will deal with the status of the multiple-person block.

Figure 16:
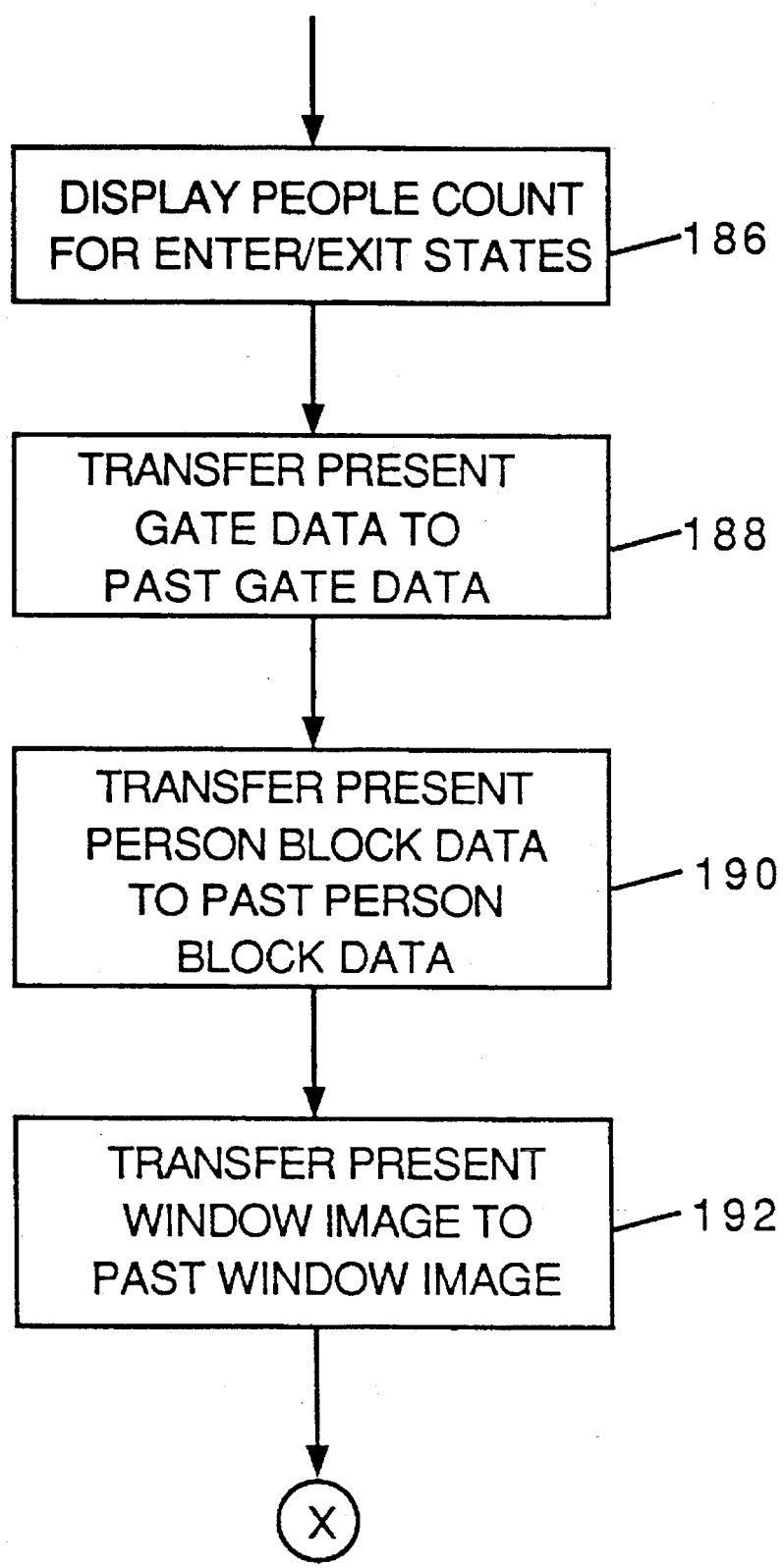

FIG. 16 illustrates the display and transfer portions of the flow chart. Step 186 displays People Count for enter and exit states. Step 188 transfers the present gate information to past gate information to prepare for the next cycle. The data transferred is the GATESTATE and the center of mass YBAR for each gate. Similarly, step 190 transfers present-person block data to past-person block data to prepare for the next cycle. The data transferred is the PERSON_STARTGATE, PERSON_ENDGATE, PERSON_STATE, and PERSON_COUNT. Finally, step 190 transfers the present-IMAGE array to the past-IMAGE array to support the consecutive cycle subtraction technique for highlighting the people in the window image.

The reliability of the illustrative system is dependent upon the robustness of the difference image. A number of factors control this result: the inherent contrast levels, the threshold level, and the subtraction techniques.

The inherent contrast may be enhanced by the use of a color filter. A color CCD camera as a video imager 10 is sensitive from blue light to the near infrared, and selection of a restricted region may prove beneficial in providing improved contrast. Another factor which can affect contrast is glare from the reflection of spotlights off the floor. Glare reduces the gain of the CCD camera due to the automatic exposure control and thus reduces the apparent contrast of other areas in the scene. A polarizing filter can be used to reduce the effect of this glare. Other video imagers can also be used that are sensitive to different portions of the electromagnetic spectrum. For instance, far infrared sensors are sensitive to the thermal spectrum and image people or objects of measurement by their heat content.

Additionally, instead of setting the THRESHOLD level to a fixed difference level, an adaptive THRESHOLD level may be used. For example, the threshold level may be set to two or three standard deviations above the mean difference value level obtained when the window is empty.

The technique of subtracting consecutive cycle frames does not yield to the most-robust difference image. A slower cycle time increases robustness, but reduces the number of times a person is analyzed within the window. Widening the window leads to other difficulties. Image subtraction with a base image is preferable, but updating the base image presents a problem. A solution is to update at a fixed time interval or whenever the adaptive threshold level shifts by a given amount. Three consecutive images of the window can be saved on a continuous basis. When a base image update is needed, the middle of the three windows is used as the update when all three windows are tagged as being empty.

If the need arises to accommodate wider entryways, the lens focal length may be reduced, and the direct overhead view no longer applies to the outer oblique edges of the format. The apparent size of the person will change due to this oblique angle, and the criteria of MINPERSONWIDTH and MAXPERSONWIDTH in the algorithm will be compromised. A variable gate width can be used to compensate for this distortion and keep the logic consistent. There is a limit to this oblique angle, however, due to the possible blockage of an adjacent outside person.

The present invention has been described as counting people, but the present invention can count any objects of measurement having somewhat homogeneous characteristics between the objects such that proper control parameters can be selected for a particular type of object. Moreover, the present invention has been described as being used in a retail environment, but the present invention encompasses any situation in which objects are simultaneously traversing a traffic zone.

Thus, the video flow monitor and method of the present invention and many of its attendant advantages will be understood from the foregoing description, and various modifications may be made in the form, construction and arrangement of the components thereof without departing from the spirit and scope of the invention or sacrificing all of their material advantages, the form described above being merely a preferred or exemplary embodiment thereof.

We claim:

1. A method of monitoring and counting retail customers traversing wide zones of a retail mall or store, said method comprising the steps of positioning an overhead video camera to produce a video image extending across a zone to be monitored for customer movement, digitizing said video image at repetitive time intervals to produce digital information representing said video image said at repetitive time intervals, processing said digital information using a linear array of segments of the video image consecutively positioned and fixed in position during processing across the zone to be monitored, with each of said gates having a predetermined size relative to the size of a retail customer for distinguishing retail customers traversing said zone by examining consecutive segments which are occupied to determine whether the number of consecutive segments which are occupied corresponds to an individual retail customer, to determine (1) the number of retail customers traversing said zone, and (2) a direction of movement transverse to said linear array of gates through said zone for said retail customers traversing said zone such that said retail customers are counted as entering or exiting said zone.

2. The method of claim 1 wherein the step of processing further comprises the steps of:

obtaining a position for a person within one of said consecutive segments; and comparing said position with a previous position for said person within said one of said consecutive segments to determine a direction of movement for said person across said zone.

3. The method of claim 1 further comprising the steps of:

storing numbers for directions of movement of said retail customers; and displaying said numbers and said directions.

4. The method of monitoring and counting retail customers of claim 1 wherein said step of processing further includes the step of:

examining a gap of an unoccupied segment between otherwise consecutive segments which are occupied to determine whether said unoccupied segment is to be considered as occupied.

5. The method of claim 1 wherein said steps following said step of positioning further comprises the step of employing a digital signal processor on a dedicated board.

6. The method of claim 5 wherein said step of digitizing further comprises employing a custom frame-grabber board coupled to said digital signal processor.

7. The method of claim 1 wherein said steps following said step of positioning further comprise the step of employing a personal computer.

8. The method of claim 7 wherein said step of digitizing further comprises employing a conventional frame-grabber board coupled to an I/O port of said personal computer.

9. A video traffic monitor for detecting and counting objects of measurement traversing a traffic zone in different directions, said video traffic monitor, comprising:

a video imager positioned above a traffic zone to be monitored for object movement, said video imager producing an image of said traffic zone in the form of an analog signal;

a signal converter coupled to said video imager for converting said analog signal into digital information representing said image;

an image handler coupled to said signal converter for storing said image represented by said digital information at repetitive time intervals; and a processor coupled to said image handler for analyzing a window of said image, said window being a subset of said image and positioned and fixed in position during analyzing substantially across said image, said window including a linear array of gates consecutively positioned and fixed in position within said window and within said image during analyzing, each of said gates having a predetermined size relative to the size of an object of measurement, said processor analyzing said gates to determine whether an object of measurement is traversing said window and to determine a direction of movement transverse to said linear array of gates for said object of measurement across said window such that said processor counts said object as entering or exiting said traffic zone, said processor distinguishing objects of measurement traversing said window by examining consecutive gates which are occupied to determine whether the number of consecutive gates which are occupied corresponds to an individual object of measurement.

10. The video traffic monitor of claim 9 wherein said processor being a digital signal processor on a dedicated board.

11. The video traffic monitor of claim 9 wherein said processor is coupled to a personal computer, said personal computer storing and displaying numbers for the directions of movement for said objects.

12. The video traffic monitor of claim 9 wherein said video imager being a monochrome camera.

13. The video traffic monitor of claim 9 wherein said video imager being a color CCD camera.

14. The video traffic monitor of claim 9 wherein said video imager being a infrared camera.

15. The video traffic monitor for detecting and counting objects of measurement traversing a traffic zone of claim 9 wherein said processor examines a gap of an unoccupied gate between otherwise consecutive gates which are occupied to determine whether said unoccupied gate is to be considered as occupied.

16. The video traffic monitor of claim 9 wherein said processor being a conventional personal computer.

17. The video traffic monitor of claim 16 wherein said image handler and said signal converter being a conventional frame-grabber board coupled to an I/O port of personal computer.

18. A video traffic analyzer for detecting the flow of objects of measurements across an image of a traffic zone having said objects of measurement traversing said traffic zone, said video traffic analyzer receiving digital information representing said image of said traffic zone and comprising a processor analyzing a window of said image, said window being a subset of said image and positioned and fixed in position during analyzing substantially across said image, said window including a linear array of gates consecutively positioned and fixed in position within said window and within said image during analyzing, each of said gates having a predetermined size relative to the size of an object of measurement, said processor analyzing said gates to determine whether an object of measurement is traversing said window and to determine a direction of movement transverse to said linear array of gates for said object of measurement traversing said window such that said processor counts said object as entering or exiting said traffic zone, said processor distinguishing objects of measurement traversing said window by examining consecutive gates which are occupied to determine whether the number of consecutive gates which are occupied corresponds to an individual object of measurement.

19. The video traffic analyzer of claim 18 wherein said processor being a digital signal processor on a dedicated board.

20. The video traffic analyzer of claim 18 wherein said processor is coupled to a personal computer, said personal computer storing and displaying a number and directions of movement for said objects.

21. The video traffic analyzer of claim 18 wherein said processor being a conventional personal computer.

22. The video traffic analyzer of claim 18 wherein said processor examines a gap of an unoccupied gate between otherwise consecutive gates which are occupied to determine whether said unoccupied gate is to be considered as occupied.

23. A method for detecting the traffic flow of objects of measurement traversing a traffic zone in different directions comprising the steps of:

producing an image of said traffic zone;

storing said image at repetitive time intervals;

analyzing a window of said image being a subset of said image and positioned and fixed in position during said analyzing substantially across said image, said window including a linear array of gates consecutively positioned and fixed in position within said window and within said image during analyzing with each of said gates having a predetermined size relative to the size of an object of measurement;

distinguishing objects of measurement traversing said window by examining consecutive gates which are occupied to determine whether the number of consecutive gates which are occupied corresponds to an individual object of measurement;

determining a direction of movement transverse to said linear array of gates for said object of measurement traversing said window; and counting said object as entering or exiting said traffic zone.

24. The method of claim 23 further comprising the steps of:

storing a result of said counting and directions of movement for said objects; and displaying said results and said directions of movement for said objects.

25. The method for detecting the traffic flow of objects of measurement traversing a traffic zone of claim 23 wherein said step of distinguishing further includes the step of:

examining a gap of an unoccupied gate between otherwise consecutive gates which are occupied to determine whether said unoccupied gate is to be considered as occupied.

26. The method of claim 23 wherein said steps following said step of storing further comprise the step of employing a digital signal processor on a dedicated board.

27. The method of claim 26 wherein said step of storing further comprises employing a custom frame-grabber board coupled to said digital signal processor.

28. The method of claim 23 wherein said steps following said step of storing further comprise the step of employing a personal computer.

29. The method of claim 28 wherein said step of storing further comprise employing a conventional frame-grabber board coupled to an I/O port of said personal computer.

30. A method for detecting the flow of objects of measurement across an image of a traffic zone having objects of measurement traversing said traffic zone, comprising the steps of:

analyzing a window of said image being a subset of said image and positioned and fixed in position during said analyzing substantially across said image, said window including a linear array of gates consecutively positioned and fixed in position within said window and within said image during analyzing with each of said gates having a predetermined size relative to the size of an object of measurement;

distinguishing objects of measurement traversing said window by examining consecutive gates which are occupied to determine whether the number of consecutive gates which are occupied corresponds to an individual object of measurement;

determining a direction of movement transverse to said linear array of gates for said object of measurement traversing said window; and counting said object as entering or exiting said traffic zone.

31. The method of claim 30 further comprising the step of employing a digital signal processor on a dedicated board.

32. The method of claim 30 further comprising the step of employing a personal computer.

33. The method of claim 30 further comprising the steps of:

storing a result of said counting and directions of movement for said objects; and displaying said results and said directions of movement for said objects.

34. The method for detecting the flow of objects of measurement across an image of a traffic zone of claim 30 wherein said step of distinguishing further includes the step of:

examining a gap of an unoccupied gate between otherwise consecutive gates which are occupied to determine whether said unoccupied gate is to be considered as occupied.

35. A video traffic monitoring system for detecting the flow of objects of measurement across a plurality of traffic zones, comprising:

a plurality of video traffic analyzers, each of said plurality of video traffic analyzers comprising a processor analyzing a window of an image of one of said plurality of traffic zones, said window being a subset of said image and positioned and fixed in position during analyzing substantially across said image, window including a linear array of gates consecutively positioned and fixed in position within said window and within said image during analyzing, each of said gates having a predetermined size relative to the size of an object of measurement, said processor analyzing said gates to determine whether an object of measurement is traversing said window and to determine a direction of movement transverse to said linear array of gates for said object of measurement traversing said window such that said processor counts said object as entering or exiting said one of said plurality of traffic zones, said processor distinguishing objects of measurement traversing said window by examining consecutive gates which are occupied to determine whether the number of consecutive gates which are occupied corresponds to an individual object of measurement; and a computer coupled to each of said plurality of video traffic analyzers, said computer storing and displaying numbers and directions of movement for said objects in each of said plurality of traffic zones.

36. The video traffic monitoring system for detecting the flow of objects of measurement across a plurality of traffic zones of claim 35 wherein said processor examines a gap of an unoccupied gate between otherwise consecutive gates which are occupied to determine whether said unoccupied gate is to be considered as occupied.

* * * * *